N. Gowen,
Hand Plow.

No. 93,431.      Patented Aug. 10, 1869.

Witnesses:      Inventor:

UNITED STATES PATENT OFFICE.

WILLIAM GOWEN, OF BARTLETT, TENNESSEE.

IMPROVEMENT IN HAND-PLOWS.

Specification forming part of Letters Patent No. 93,431, dated August 10, 1869.

*To all whom it may concern:*

Be it known that I, WILLIAM GOWEN, of Bartlett, in the county of Shelby and State of Tennessee, have invented a new and Improved Hand-Plow; and I do hereby declare that the following is a full, clear, and exact description thereof, which will enable others skilled in the art to make and use the same, reference being had to the accompanying drawings, forming part of this specification, in which—

Figure 1:
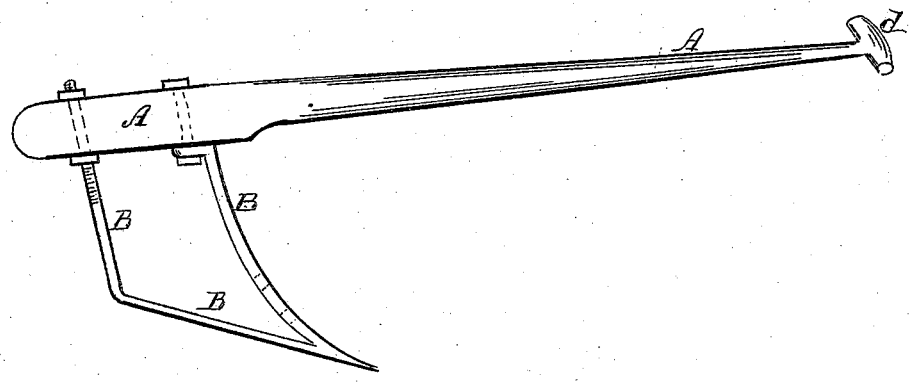
Figures 2, 3, 4, 5:
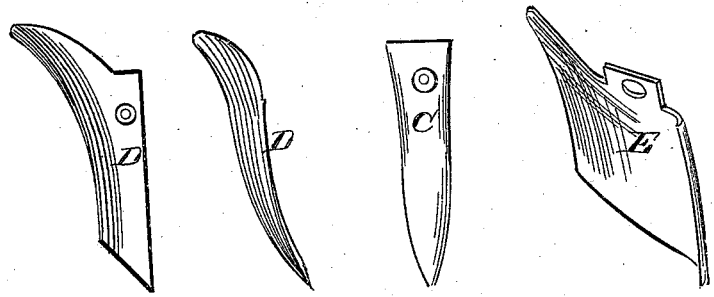

Figure 1 is a side view of the beam and plow-frame, the plow-plates being removed. Figs. 2, 3, 4, and 5 are detail views of the detached plow-plates.

Similar letters of reference indicate corresponding parts.

My invention has for its object to furnish a simple and convenient hand plow or cultivator designed especially for garden use in putting in the seeds and cultivating the plants; and it consists in the construction and combination of the various parts, as hereinafter more fully described.

A is the plow beam or shaft, to the forward end of which is attached a cross-bar or handle, $a'$, as shown in Fig. 1, for the convenience of the one using the plow.

B is the plow-frame, to which the plows are attached, and which is made in about the shape shown in Fig. 1, the front upright and angle being so formed as to serve as a bull-tongue for opening a drill to receive the seed or for cultivating the ground around small plants. The rear arm or upright of the plow-frame B has a screw-thread cut upon it, and passes up through the rear end of the beam A, to which it is secured by nuts placed one above and the other beneath the said beam, as shown in Fig. 1. This enables the inclination of the beam A to be conveniently adjusted according to the height of the person using the plow. The upper end of the forward arm or upright of the frame B may be bolted to the beam A, or secured in any other convenient manner. As the plants become larger, a shovel-plow, C, may be attached to the front arm or upright of the frame B by a bolt passing through a hole in the said shovel C and through a hole in the said front arm or upright of the frame B. As the plants become still larger and require to have more soil thrown around them, the turn-plow D, having a narrow mold-board, is bolted to the frame B.

E is a scraper, which may be bolted to the frame B, when required, for the removal of weeds.

If desired, a strap may be attached to the forward end of the beam A, to be passed over the shoulders of the operator to enable the plow to be drawn with more ease than when drawn wholly by the hands.

Having thus described my invention, what I claim as new, and desire to secure by Letters Patent, is—

1. The adjustable frame B, constructed as described, in combination with the beam A, as and for the purpose set forth.

2. The combination of the detachable shovel-plow C with the adjustable plow-frame B and beam A, substantially as herein shown and described, and for the purpose set forth.

3. The combination of the detachable turn-plow D with the adjustable plow-frame B and beam A, substantially as herein shown and described, and for the purpose set forth.

4. The combination of the detachable scraper E with the adjustable frame B and beam A, substantially as herein shown and described, and for the purpose set forth.

WM. GOWEN.

Witnesses:
 THOS. WILLIAMS,
 W. F. GOWEN.